March 23, 1965   A. LARENTIS ETAL   3,174,522
NUT LOCKING DEVICE
Filed Aug. 21, 1961

INVENTORS
ALBANO LARENTIS
EUSEBIO H. ESPEJO
VICENTE MAZZOCCO

BY Abraham R. Saffitz
ATTORNEY

United States Patent Office 3,174,522
Patented Mar. 23, 1965

3,174,522
NUT LOCKING DEVICE
Albano Larentis, Libertad 1371, Eusebio H. Espejo, Canning 896, Hurlingham, and Vicente Mazzocco, all of Buenos Aires, Argentina
Filed Aug. 21, 1961, Ser. No. 132,630
5 Claims. (Cl. 151—14)

This invention relates to a nut locking device, and more particularly to a novel nut assembly having means for effectively locking same against loosening due to vibration, shocks or the like.

In accordance with a preferred embodiment, the novel nut assembly of this invention comprises a resilient sleeve member having an outwardly projecting flange at each end thereof, a nut having an internal annular groove capable of receiving one of said sleeve flanges, a lock nut having an internal annular groove capable of receiving the other of said sleeve flanges, and means in said nut and lock nut grooves for locking the assembly securely when the latter is applied to a bolt, metal screw or the like and said nut and lock nut are brought into locking engagement.

In a modified embodiment of the invention, the sleeve member is non resilient and formed integrally with the nut, the free end of said sleeve having an outwardly extending flange capable of being forced into an inner annular groove in the lock nut, there being an open spiral lock-ring housed in said groove and capable of being forced into locking engagement with locking means in said groove, the locking means including a second nut having an axial bore threaded through a part of its length, the threaded part extending from one end to an inner annular groove in the other end, the annular groove defined by a cylindrical axially extending bottom wall, an inwardly tapering end wall bounding the bottom wall and threaded bore, and an inwardly projecting annular flange which coacts with an open spiral lock ring which is placed in the groove. The locking ring is radially contracted when the free end of the sleeve is moved toward the inwardly tapering end wall and this aids in the locking function.

The main object of the invention is to provide a nut locking device in accordance with both of the above-described embodiments which will effectively retain a nut against loosening through vibration, shock or the like.

Other objects and advantages of the invention will become apparent in the course of the following description.

In order that the invention may be more clearly understood and readily carried into practice, two of the preferred embodiments thereof have been illustrated by way of example in the accompanying drawings, in which.

The same reference numerals are used to indicate like parts throughout the drawings.

Figure 1:
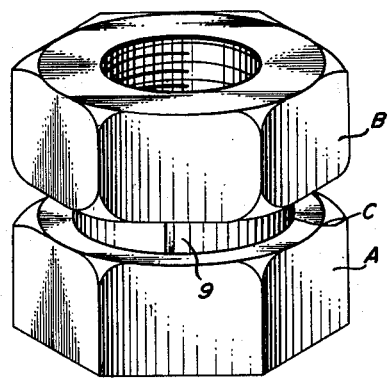
FIG. 1 is a perspective view of a locking device embodying the invention.
Figure 2:
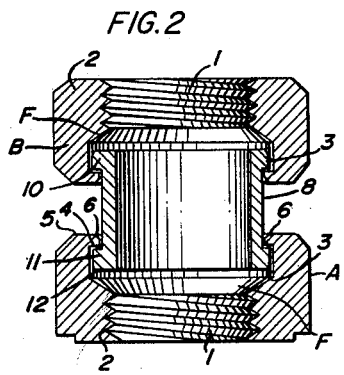
FIG. 2 is a vertical sectional view of the locking device shown in FIG. 1.
Figure 3:
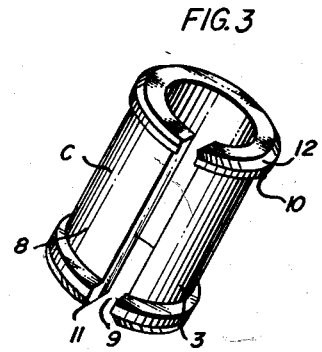
FIG. 3 is a perspective view of the resilient sleeve member shown in FIG. 2.

Referring first to FIGS. 1 to 3, the locking device as shown comprises generally a nut A, a lock nut B and a sleeve member C.

As clearly shown in FIG. 2, the inner thread 1 of nut A instead of extending throughout the length of the central opening as in conventional nuts, extends from one end 2 thereof to a relatively deep inner annular groove 3 formed in the nut body. The outer end of the groove 3 terminates in a flange 4 defining the opposite end 5 of said nut A and being bevelled at the inner periphery thereof, as indicated at 6. The central nut opening at the end 5 is somewhat larger in diameter than at the end 2. The inner end portion 7 of the groove 3 is inwardly and downwardly tapered and constitutes a locking means as will be explained fully hereinafter.

The construction of the lock nut B is the same as that of nut A, but this lock nut B is used in inverted position relative to nut A and therefore, when in operative position, the inner end portion of groove 3 indicated at 7 will taper inwardly and upwardly as shown in FIG. 2.

The sleeve member C comprises a metal tubular body 8 longitudinally split as at 9 so as to make same relatively resilient. At each end of said tubular body 8 there is provided an outwardly projecting substantially annular flange 10, 11, as clearly shown in FIG. 3, and the outer periphery of each of the flanges 10, 11 is bevelled as at 12.

The operation of the locking device as illustrated in FIGS. 1 to 3 is as follows: Assuming nut B is used as the lock nut, the nut A is first screwed onto the bolt, metal screw or the like until it reaches home. The sleeve member C is then slid about the bolt or screw shank (not shown). It will be understood that the inner diameter of the tubular body 8 will be only slightly larger than the diameter of the bolt or screw on which it is to be used. The lock nut B is then screwed onto the bolt or screw until the sleeve flange 11 engages the groove 3 in nut A and the flange 10 engages the groove 3 in lock nut B. This is facilitated by the bevelled inner peripheries 6 of the openings at the ends 5 of both nut A and lock nut B which are opposed to each other, and by the bevelled outer periphery of flanges 10 and 11, indicated at 12 in FIG. 3.

With the sleeve flanges 10 and 11 engaging the grooves 3 in lock nut B and nut A, respectively, further turning of the lock nut B towards the nut A will cause the sleeve flanges 10 and 11 to engage the respective tapering groove end portions 7, thereby forming the assembly of nut A, lock nut B and sleeve member C into a solid locking unit.

Figure 4:
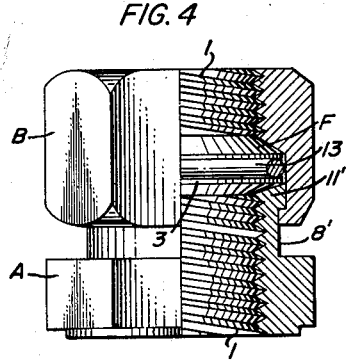
FIG. 4 is a partly sectional elevation of a modified embodiment of the locking device in accordance with the invention.
Figure 5:
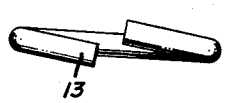
FIG. 5 is an elevation of a lock-ring used in the embodiment shown in FIG. 4.

FIGS. 4 and 5 illustrate a modified embodiment of the invention. In this embodiment, the sleeve member C is substituted by a tubular extension 8' integral with nut A and having an outwardly projecting flange 11' at the free end thereof. Inasmuch as the tubular extension 8' is integral with the nut A, the latter has no groove similar to groove 3 of the previous embodiment and the central opening in nut A is uniform in diameter and threaded throughout the thickness of the nut.

The construction of the lock nut B is similar to that of the previous embodiment of FIGS. 1–3. However, the tubular extension 8' is not split longitudinally as in the case of the sleeve member C, and therefore it is not resilient. The flange 11' and the opening into the lock nut groove 3 are so dimensioned, that said flange 11' can be forced into groove 3 even though some drawing of the metal flange 11' may occur in the operation.

Inasmuch as the tubular extension 8' is not resilient, as stated above, an open spiral lock-ring 13, shown more clearly in FIG. 5, is housed in the groove 3 in lock nut B. Thus, when the nut A of FIG. 4 is screwed home and the lock nut B with the lock-ring 13 within the groove 3 thereof has also been screwed on until the flange 11' has entered the groove 3 as shown in FIG. 4, further turning of the lock nut B towards the nut A will cause the flange 11' to press the lock-ring 13 against and along the tapering wall 7 to a firm gripping contact with the external threads of the bolt, metal screw or the like to which the assembly is applied.

While we have described and illustrated a specific embodiment of the invention, it should be understood that such embodiment is merely illustrative and that the invention is not limited to the specific details disclosed but only by the scope of the appended claims.

We claim:

1. A first internally threaded nut locking device which comprises a nut having an annular inner groove defined in an inwardly projecting circumferential bottom wall at the base of said nut constituting an inwardly extending annular flange, said nut having a relatively short outer side wall adjacent said inwardly extending annular flange, the inner periphery of said annular flange defining an enlarged opening on one side of said nut and an inner inwardly tapering side wall, a second internally threaded nut having an annular inner groove defined in an inwardly projecting circumferential bottom wall at the base of said second nut constituting an inwardly extending annular flange of said second nut, said second nut having a relatively short outer side wall adjacent said inwardly extending annular flange, the inner periphery of said annular flange of said second nut defining an enlarged opening on one side of said second nut and an inner inwardly tapering side wall, and inserted between the annular inner grooves of said first and second nut respectively, a relatively resilient metal sleeve member separating first and second nuts along the length of said sleeve, said sleeve member having an outwardly extending flange at each end thereof, said flanges being capable of being forced above the respective annular flanges of said first and second nuts and into the respective annular inner grooves of said nuts, and said outwardly extending flanges of said sleeve member bearing against the inner tapering side walls of the inner periphery of each of said nuts to bring the top of said sleeve into gripping engagement with the male threads of a bolt or metal screw to which the locking device is applied.

2. A nut locking device as claimed in claim 1, wherein said sleeve member is split longitudinally to be resilient in a circumferential direction.

3. A nut locking device as claimed in claim 1, wherein the inner periphery of said inwardly extending annular flanges is bevelled above said annular inner groove.

4. A nut locking device which comprises a first nut having an axial bore threaded throughout its length, one end of said first nut being an integral relatively thin-walled longitudinal tubular extension, an outwardly extending flange at the free end of said tubular extension, said free end being inwardly beveled, a second nut having an axial bore threaded throughout a portion of its length, said threaded portion extending from one end to an inner annular groove in the other end thereof, said annular groove being defined by a cylindrical axially extending bottom wall, an inwardly tapering end wall joining said bottom wall and said threaded bore portion, and an inwardly projecting annular flange at the terminus of said groove and said second nut, said outwardly extending flange being located in said groove behind said inwardly projecting flange and an open spiral lock-ring located in said groove between said free end of said tubular extension and said inwardly tapering end wall of said groove, whereby said lock-ring is radially contracted when said free end is moved toward said tapering end wall.

5. A locking device comprising a first internally threaded nut having an annular groove defined at the base thereof in an inwardly projecting bottom wall constituting an annular flange therein, said annular flange of said first nut defining an enlarged opening below the internal threaded portion thereof and an inwardly tapering side wall adjacent the maximum diameter of said inner groove, said first nut having a short outer wall adjacent the inwardly extending annular flange which defines an opening on one side of said nut remote from the threaded portion therein, a second internally threaded nut having a sleeve portion integral with and projecting thereabove for separating said first and second nuts along its length, said sleeve portion being offset inwardly from the side walls of said second nut and having an outwardly extending flange at its remote end for insertion into the annular inner groove of said first nut, the periphery of the flange of said sleeve being bevelled downwardly for a lock ring which comes into gripping relation with the inwardly tapering side wall above the annular inner groove of said first nut when forced into engagement with the groove of said first nut.

References Cited in the file of this patent
UNITED STATES PATENTS

| | | |
|---|---|---|
| 1,166,538 | Nesbit | Jan. 4, 1916 |
| 1,607,273 | Hecht | Nov. 16, 1926 |
| 1,639,407 | Hutton | Aug. 16, 1927 |
| 2,075,467 | Quesada | Mar. 30, 1937 |
| 2,313,763 | Olsen | Mar. 16, 1943 |
| 2,518,469 | Harding | Aug. 15, 1950 |

FOREIGN PATENTS

| | | |
|---|---|---|
| 455,853 | France | June 3, 1913 |
| 362,692 | Great Britain | Dec. 10, 1931 |